United States Patent
Rudy et al.

(10) Patent No.: US 10,460,751 B2
(45) Date of Patent: Oct. 29, 2019

(54) STRIPE HEIGHT LAPPING CONTROL STRUCTURES FOR A MULTIPLE SENSOR ARRAY

(71) Applicant: WESTERN DIGITAL (FREMONT), LLC, Fremont, CA (US)

(72) Inventors: Steven C. Rudy, Carmel Valley, CA (US); Christopher L. Beaudry, San Jose, CA (US); Shaoping Li, San Ramon, CA (US)

(73) Assignee: WESTERN DIGITAL (FREMONT), LLC, Fremont, CA (US)

(*) Notice: Subject to any disclaimer, the term of this patent is extended or adjusted under 35 U.S.C. 154(b) by 0 days.

(21) Appl. No.: 15/988,122

(22) Filed: May 24, 2018

(65) Prior Publication Data

US 2018/0268847 A1    Sep. 20, 2018

Related U.S. Application Data

(62) Division of application No. 15/648,594, filed on Jul. 13, 2017, now Pat. No. 10,008,222, which is a (Continued)

(51) Int. Cl.
| | |
|---|---|
| *G11B 5/31* | (2006.01) |
| *G11B 5/48* | (2006.01) |
| *G11B 5/127* | (2006.01) |
| *G11B 5/39* | (2006.01) |
| *G11B 5/11* | (2006.01) |

(52) U.S. Cl.
CPC .......... *G11B 5/3169* (2013.01); *G11B 5/127* (2013.01); *G11B 5/3166* (2013.01); *G11B 5/3173* (2013.01); *G11B 5/3977* (2013.01); *G11B 5/486* (2013.01); *G11B 5/4886* (2013.01); (Continued)

(58) Field of Classification Search
None
See application file for complete search history.

(56) References Cited

U.S. PATENT DOCUMENTS

| | | | |
|---|---|---|---|
| 3,938,193 A * | 2/1976 | Sargunar | G11B 5/11 360/137 |
| 4,670,732 A | 6/1987 | Church | |

(Continued)

FOREIGN PATENT DOCUMENTS

| | | | | |
|---|---|---|---|---|
| EP | 0 253 460 A1 | 1/1988 | | |
| JP | 2002157710 A * | 5/2002 | ........... | G11B 5/3912 |

(Continued)

OTHER PUBLICATIONS

Ex Parte Quayle Action on U.S. Appl. No. 14/560,731 dated Jan. 20, 2017.

(Continued)

*Primary Examiner* — William J Klimowicz
(74) *Attorney, Agent, or Firm* — Foley & Lardner LLP

(57) ABSTRACT

A method and system provide a storage device. A plurality of read sensor stacks for each reader of the storage device are provided. The read sensor stacks are distributed along a down track direction and offset in a cross-track direction. A plurality of electronic lapping guides (ELGs) are provided for the read sensor stacks. The read sensor stacks are lapped. Lapping is terminated based on signal(s) from the ELG(s).

6 Claims, 6 Drawing Sheets

Related U.S. Application Data division of application No. 14/560,731, filed on Dec. 4, 2014, now Pat. No. 9,721,595.

(52) U.S. Cl.
CPC .............. *G11B 5/11* (2013.01); *G11B 5/3909* (2013.01); *G11B 5/3912* (2013.01); *G11B 5/3932* (2013.01)

(56) References Cited

U.S. PATENT DOCUMENTS

| | | | |
|---|---|---|---|
| 4,689,877 A | 9/1987 | Church | |
| 5,023,991 A | 6/1991 | Smith | |
| 5,065,483 A | 11/1991 | Zammit | |
| 5,210,667 A | 5/1993 | Zammit | |
| 5,255,141 A | 10/1993 | Valstyn et al. | |
| 5,494,473 A * | 2/1996 | Dupuis | B24B 37/048 29/603.09 |
| 5,699,212 A | 12/1997 | Erpelding et al. | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,046,885 A | 4/2000 | Aimonetti et al. | |
| 6,055,138 A | 4/2000 | Shi | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,103,073 A | 8/2000 | Thayamballi | |
| 6,108,166 A | 8/2000 | Lederman | |
| 6,125,018 A | 9/2000 | Takagishi et al. | |
| 6,130,779 A | 10/2000 | Carlson et al. | |
| 6,134,089 A | 10/2000 | Barr et al. | |
| 6,193,548 B1 | 2/2001 | Sigl et al. | |
| 6,193,584 B1 * | 2/2001 | Rudy | B24B 37/013 29/593 |
| 6,201,673 B1 | 3/2001 | Rottmayer et al. | |
| 6,233,116 B1 | 5/2001 | Chen et al. | |
| 6,304,414 B1 | 10/2001 | Crue et al. | |
| 6,370,763 B1 | 4/2002 | Watanuki et al. | |
| 6,404,600 B1 | 6/2002 | Hawwa et al. | |
| 6,504,676 B1 | 1/2003 | Hiner et al. | |
| 6,609,948 B1 * | 8/2003 | Fontana, Jr. | B82Y 10/00 29/603.14 |
| 6,611,398 B1 | 8/2003 | Rumpler et al. | |
| 6,700,738 B1 | 3/2004 | Sin et al. | |
| 6,760,196 B1 | 7/2004 | Niu et al. | |
| 6,801,411 B1 | 10/2004 | Lederman et al. | |
| 6,884,148 B1 | 4/2005 | Dovek et al. | |
| 6,912,106 B1 | 6/2005 | Chen et al. | |
| 6,935,923 B2 * | 8/2005 | Burbank | G11B 5/3906 29/603.09 |
| 6,947,258 B1 | 9/2005 | Li | |
| 6,961,221 B1 | 11/2005 | Niu et al. | |
| 6,989,972 B1 | 1/2006 | Stoev et al. | |
| 6,997,784 B2 * | 2/2006 | Bunch | B24B 37/048 29/603.1 |
| 7,006,327 B2 | 2/2006 | Krounbi et al. | |
| 7,007,372 B1 | 3/2006 | Chen et al. | |
| 7,012,832 B1 | 3/2006 | Sin et al. | |
| 7,016,143 B2 | 3/2006 | Kirschenbaum et al. | |
| 7,023,658 B1 | 4/2006 | Knapp et al. | |
| 7,026,063 B2 | 4/2006 | Ueno et al. | |
| 7,110,289 B1 | 9/2006 | Sin et al. | |
| 7,111,382 B1 | 9/2006 | Knapp et al. | |
| 7,119,995 B2 | 10/2006 | Granstrom et al. | |
| 7,124,654 B1 | 10/2006 | Davies et al. | |
| 7,149,061 B2 * | 12/2006 | Yamakura | G11B 5/3169 360/316 |
| 7,154,715 B2 | 12/2006 | Yamanaka et al. | |
| 7,199,975 B1 | 4/2007 | Pan | |
| 7,211,339 B1 | 5/2007 | Seagle et al. | |
| 7,212,384 B1 | 5/2007 | Stoev et al. | |
| 7,283,327 B1 | 10/2007 | Liu et al. | |
| 7,284,316 B1 | 10/2007 | Huai et al. | |
| 7,292,400 B2 | 11/2007 | Bishop | |
| 7,337,530 B1 | 3/2008 | Stoev et al. | |
| 7,354,664 B1 | 4/2008 | Jiang et al. | |
| 7,417,832 B1 | 8/2008 | Erickson et al. | |
| 7,508,627 B1 | 3/2009 | Zhang et al. | |
| 7,522,377 B1 | 4/2009 | Jiang et al. | |
| 7,551,393 B2 | 6/2009 | Biskeborn et al. | |
| 7,551,406 B1 * | 6/2009 | Thomas | G11B 5/102 360/317 |
| 7,639,457 B1 | 12/2009 | Chen et al. | |
| 7,660,080 B1 | 2/2010 | Liu et al. | |
| 7,681,303 B2 * | 3/2010 | Kondo | G11B 5/1278 29/603.09 |
| 7,719,795 B2 | 5/2010 | Hu et al. | |
| 7,800,858 B1 | 9/2010 | Bajikar et al. | |
| 7,874,063 B2 * | 1/2011 | Matono | G11B 5/3166 29/603.05 |
| 7,910,267 B1 | 3/2011 | Zeng et al. | |
| 7,911,735 B1 | 3/2011 | Sin et al. | |
| 7,911,737 B1 | 3/2011 | Jiang et al. | |
| 8,008,912 B1 | 8/2011 | Shang | |
| 8,065,788 B2 | 11/2011 | Guruz et al. | |
| 8,072,705 B1 | 12/2011 | Wang et al. | |
| 8,104,166 B1 | 1/2012 | Zhang et al. | |
| 8,151,441 B1 | 4/2012 | Rudy et al. | |
| 8,165,709 B1 * | 4/2012 | Rudy | G11B 5/3166 700/121 |
| 8,200,054 B1 | 6/2012 | Li et al. | |
| 8,307,539 B1 * | 11/2012 | Rudy | G11B 5/3166 216/62 |
| 8,351,162 B2 * | 1/2013 | Etoh | G11B 5/1278 360/121 |
| 8,400,731 B1 | 3/2013 | Li et al. | |
| 8,491,801 B1 | 7/2013 | Tanner et al. | |
| 8,495,813 B1 | 7/2013 | Hu et al. | |
| 8,498,084 B1 | 7/2013 | Leng et al. | |
| 8,506,828 B1 | 8/2013 | Osugi et al. | |
| 8,533,937 B1 | 9/2013 | Wang et al. | |
| 8,603,593 B1 | 12/2013 | Roy et al. | |
| 8,611,054 B1 | 12/2013 | Shang et al. | |
| 8,611,055 B1 | 12/2013 | Pakala et al. | |
| 8,630,068 B1 | 1/2014 | Mauri et al. | |
| 8,643,980 B1 | 2/2014 | Fowler et al. | |
| 8,665,561 B1 | 3/2014 | Knutson et al. | |
| 8,703,397 B1 | 4/2014 | Zeng et al. | |
| 8,711,518 B1 | 4/2014 | Zeng et al. | |
| 8,711,528 B1 | 4/2014 | Xiao et al. | |
| 8,739,391 B2 * | 6/2014 | Childress | G11B 5/6082 29/737 |
| 8,749,790 B1 | 6/2014 | Tanner et al. | |
| 8,760,818 B1 | 6/2014 | Diao et al. | |
| 8,780,498 B1 | 7/2014 | Jiang et al. | |
| 8,792,208 B1 | 7/2014 | Liu et al. | |
| 8,792,312 B1 | 7/2014 | Wang et al. | |
| 8,793,866 B1 | 8/2014 | Zhang et al. | |
| 8,797,680 B1 | 8/2014 | Luo et al. | |
| 8,797,684 B1 | 8/2014 | Tran et al. | |
| 8,797,686 B1 | 8/2014 | Bai et al. | |
| 8,797,692 B1 | 8/2014 | Guo et al. | |
| 8,813,324 B2 | 8/2014 | Emley et al. | |
| 8,824,106 B1 * | 9/2014 | Garfunkel | G11B 5/2654 360/316 |
| 8,873,204 B1 * | 10/2014 | Gao | G11B 5/3977 360/319 |
| 8,891,207 B1 * | 11/2014 | Li | G11B 5/115 360/121 |
| 8,908,333 B1 * | 12/2014 | Rudy | G11B 5/115 360/319 |
| 8,970,988 B1 * | 3/2015 | Li | G11B 5/2652 360/235.4 |
| 9,042,058 B1 | 5/2015 | Li et al. | |
| 9,042,059 B1 | 5/2015 | Katine et al. | |
| 9,431,031 B1 | 8/2016 | Xiao et al. | |
| 9,721,595 B1 | 8/2017 | Rudy et al. | |

(56) References Cited

U.S. PATENT DOCUMENTS

| | | |
|---|---|---|
| 9,786,305 B1 * | 10/2017 | Li .................. G11B 5/3948 |
| 10,008,222 B2 * | 6/2018 | Rudy ................ G11B 5/3169 |
| 2006/0002032 A1 | 1/2006 | Li et al. |
| 2006/0028770 A1 * | 2/2006 | Etoh ................ G11B 5/1278 |
| | | 360/313 |
| 2007/0030594 A1 | 2/2007 | Biskeborn et al. |
| 2007/0230056 A1 | 10/2007 | Beach et al. |
| 2008/0072418 A1 | 3/2008 | Kondo et al. |
| 2010/0290157 A1 | 11/2010 | Zhang et al. |
| 2011/0086240 A1 | 4/2011 | Xiang et al. |
| 2011/0276287 A1 | 11/2011 | Iben et al. |
| 2012/0087045 A1 | 4/2012 | Yanagisawa et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0070371 A1 * | 3/2013 | Childress ........... G11B 5/6082 |
| | | 360/235.4 |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |
| 2015/0062735 A1 * | 3/2015 | Sapozhnikov ......... G11B 5/115 |
| | | 360/46 |
| 2015/0116867 A1 | 4/2015 | Childress et al. |
| 2015/0140685 A1 * | 5/2015 | Watanabe ............ H01L 21/312 |
| | | 438/3 |
| 2015/0243302 A1 * | 8/2015 | Kief ................ G11B 5/3964 |
| | | 360/245.8 |
| 2015/0255092 A1 * | 9/2015 | Macken ............. G11B 5/3958 |
| | | 360/324 |
| 2015/0325260 A1 | 11/2015 | Singleton et al. |
| 2016/0005424 A1 * | 1/2016 | McKinlay ............ G11B 5/115 |
| | | 360/121 |
| 2016/0005425 A1 * | 1/2016 | McKinlay ............ G11B 5/265 |
| | | 360/121 |
| 2016/0203837 A1 * | 7/2016 | Han ................... G11B 5/29 |
| | | 360/110 |

FOREIGN PATENT DOCUMENTS

| | | | |
|---|---|---|---|
| JP | 2006172705 A | * | 6/2006 |
| JP | 2009217911 A | * | 9/2009 |
| WO | WO-2015030676 A1 | * | 3/2015 ............ G11B 5/3951 |

OTHER PUBLICATIONS

US Office Action on U.S. Appl. No. 15/648,594 dated Mar. 29, 2018.

* cited by examiner

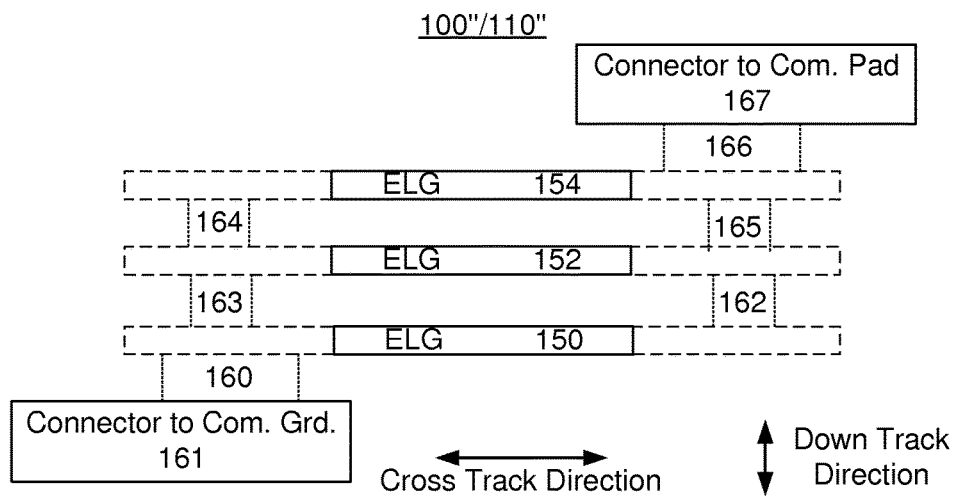
FIG. 7
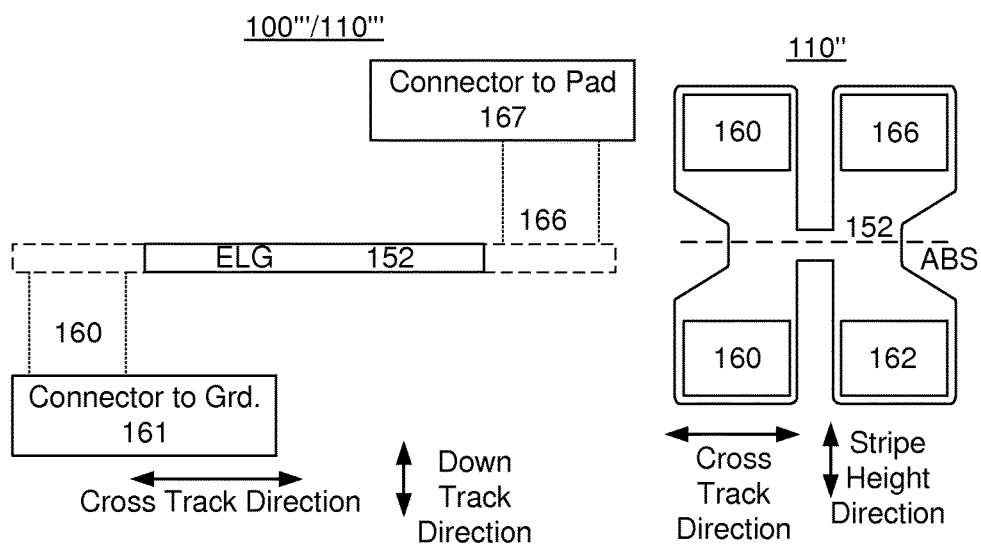
FIG. 8A
FIG. 8B

STRIPE HEIGHT LAPPING CONTROL STRUCTURES FOR A MULTIPLE SENSOR ARRAY

CROSS-REFERENCE TO RELATED PATENT APPLICATIONS

This application is a divisional of U.S. application Ser. No. 15/648,594, filed on Jul. 13, 2017, which is a divisional of U.S. application Ser. No. 14/560,731, filed on Dec. 4, 2014, now U.S. Pat. No. 9,721,595, the entireties of each of which are incorporated by reference herein.

BACKGROUND

FIG. 1 depict an air-bearing surface (ABS) view of a conventional read transducer 10. The conventional read transducer 10 includes shields 12 and 20, sensor 14 and magnetic bias structures 16. The read sensor 14 is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures. These magnetic bias structures are used to magnetically bias the sensor layer of the sensor 14.

Although the conventional magnetic recording transducer 10 functions, there are drawbacks. In particular, the conventional magnetic recording transducer 10 may not function adequately at higher recording densities. Two-dimensional magnetic recording (TDMR) technology may enable significantly higher recording densities. In TDMR, multiple read sensors are used. These sensors are longitudinally distributed along the cross track direction but are aligned in the down track direction. The central sensor reads the data from a track of interest, while the outer sensors sense the data in adjacent tracks in order to account for noise.

Although TDMR might be capable of higher recording densities, issues may be faced at skew. As a result, the transducer may not perform as desired for all skew angles. In addition, fabrication of the sensors may be challenging. Accordingly, what is needed is a system and method for improving the performance of a magnetic recording read transducer, particular for TDMR.

BRIEF DESCRIPTION OF THE DRAWINGS

FIG. 7 depicts an ABS-facing view of another exemplary embodiment of ELGs for a magnetic recording read transducer.

FIGS. 8A-8B depict ABS-facing and plan views of another exemplary embodiment of an ELG for a magnetic recording read transducer.

DETAILED DESCRIPTION

Figure 1:
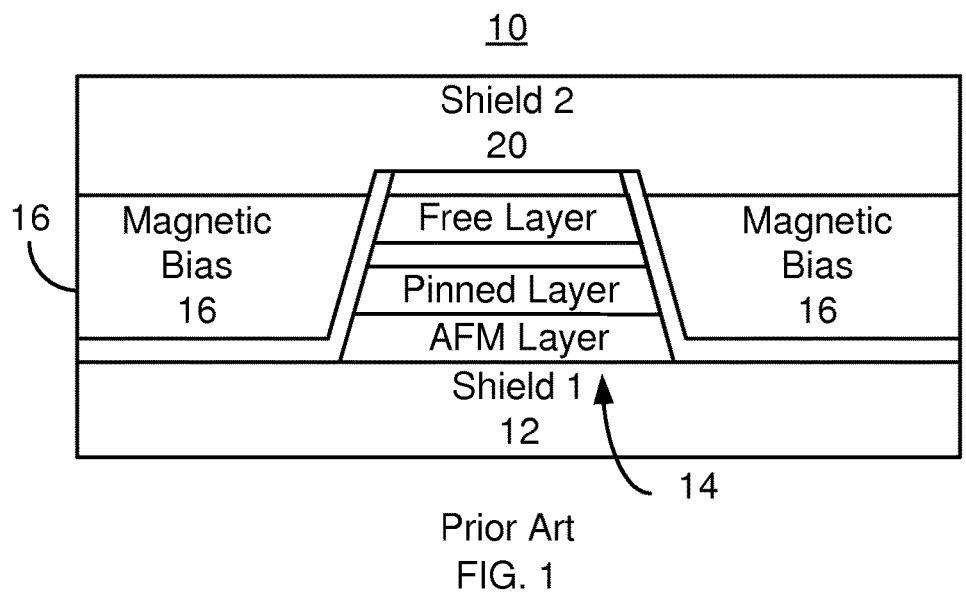
FIG. 1 depicts a conventional read transducer.
Figure 2:
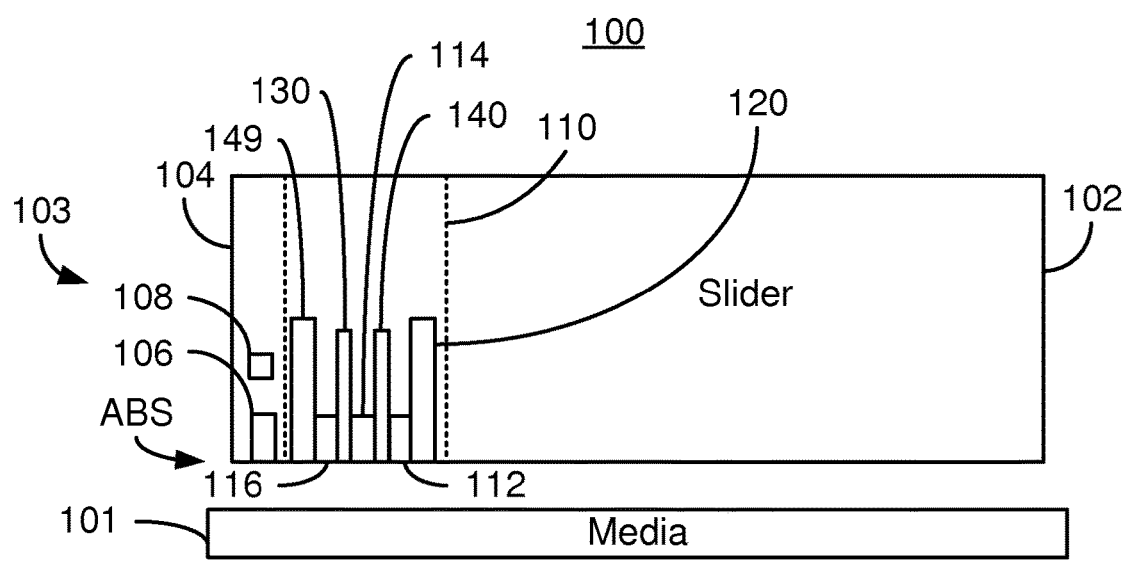
FIG. 2 depicts an exemplary embodiment of a disk drive.
Figure 3A:
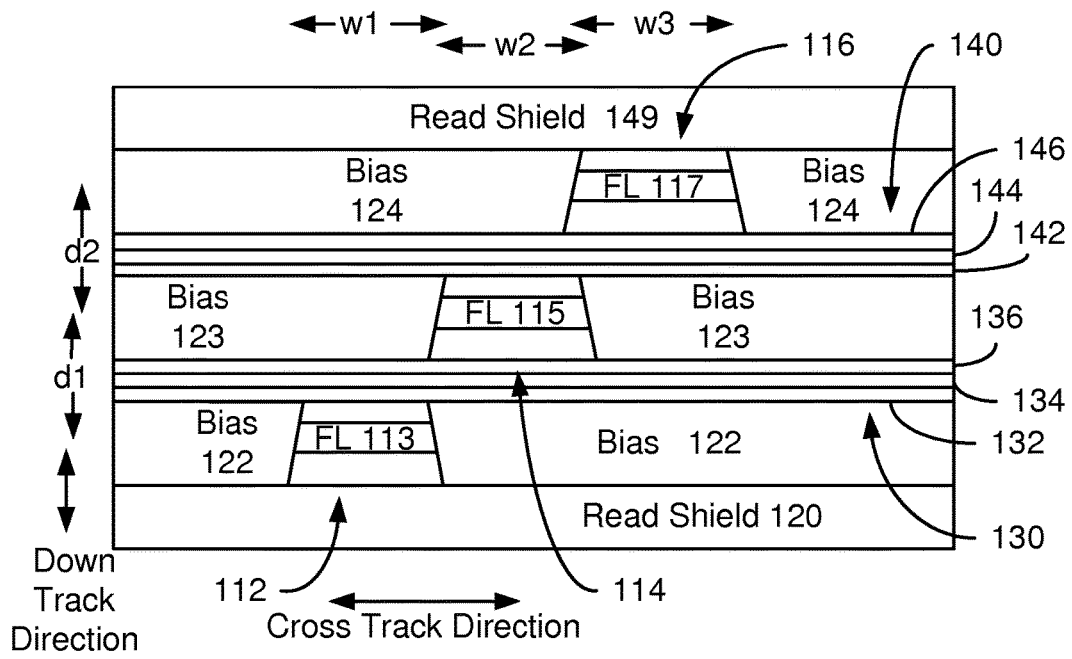
FIGS. 3A and 3B depict ABS-facing views of an exemplary embodiment of a portion of a magnetic recording read transducer including the device and the lapping guides.
Figure 3B:
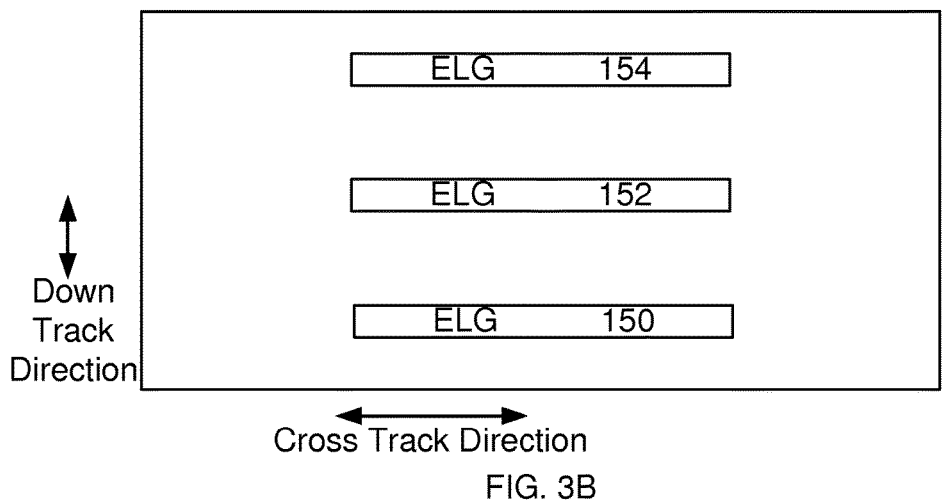

FIGS. 2 and 3A-3B depict side and ABS-facing views of a disk drive 100. For clarity, FIGS. 2, 3A and 3B are not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of one or more of the components and/or their sub-components might be used. Further, in some embodiments, the devices shown in FIG. 3B may be removed during fabrication and thus not present in the final disk drive 100. However, in other embodiments, the devices shown in FIG. 3B may be present in the finished disk drive 100. Thus, FIG. 3B may be considered to how the disk drive 100 during fabrication, while FIG. 3A may depict the disk drive during fabrication or after manufacturing is complete.

The disk drive 100 includes media 101, a slider 102, a head 103 including a write transducer 104 and a read transducer 110. The write transducer includes at least a write pole 106 and coil(s) 108 for energizing the pole 106. Additional and/or different components may be included in the disk drive 100. Although not shown, the slider 102, and thus the transducers 104 and 110 are generally attached to a suspension (not shown). The transducers 104 and 110 are fabricated on the slider 102 and include an ABS proximate to the media 101 during use. Although both a write transducer 104 and a read transducer 110 are shown, in other embodiments, only a read transducer 110 may be present.

The read transducer 110 includes multiple read sensors 112, 114 and 116. The read sensors 112, 114 and 116 include sensor layers 113, 115 and 117, respectively, that may be free layers in a magnetoresistive junction such as a giant magnetoresistive (GMR) sensor, a tunneling magnetoresistive (TMR) sensor. Thus, each sensor 112, 114 and 116 may include a pinning layer, a pinned layer, a nonmagnetic spacer layer and a free layer 113, 115, and 117, respectively. For simplicity, only the free layers 113, 115 and 117 are separately labeled in FIG. 3A. The sensors 112, 114 and 116 may also include seed layer(s) (not shown) and capping layer(s) (not shown). The pinning layer is generally an AFM layer that is magnetically coupled to the pinned layer. In other embodiments, however, the pinning layer may be omitted or may use a different pinning mechanism. The free layers 113, 115 and 117 are each shown as a single layer, but may include multiple layers including but not limited to a synthetic antiferromagnetic (SAF) structure. The pinned layer may also be a simple layer or a multilayer. Although shown as extending the same distance from the ABS, the pinned layer may extend further than the corresponding free layer 113, 115, and/or 117, respectively. The nonmagnetic spacer layer may be a conductive layer, a tunneling barrier layer, or other analogous layer. Although depicted as a GMR or TMR sensor, in other embodiments, other structures and other sensing mechanisms may be used for the sensor.

Although described as read sensors, if FIG. 3A is considered to depict the transducer 110 before completion, particularly before lapping, the sensors 112, 114 and 116 may be read sensor stacks. Read sensor stacks include the layers provided for the read sensors, but definition of the stacks may not be completed. For example, lapping of the transducer 110 may not have been performed. However, the track widths of the sensors would have been defined in the cross track direction. For simplicity, when referring to FIG. 3A, items 112, 114 and 116 are generally termed sensors.

The read sensors 112, 114 and 116 are separated by distances d1 and d2 in a down track direction. The down track direction is perpendicular to the cross track direction. The cross track direction and track width direction are the same. In the embodiment shown in FIGS. 2-3B, the distance d1 and d2 between the sensors 112 and 114 and between the sensors 114 and 116, respectively, are the same. However, in other embodiments, the distances between the sensors 112, 114 and 116 may not be the same. It is generally desirable to reduce the distance between the sensors 112, 114 and 116 in order to reduce the skew effect. The distances d1 and d2 may each be at least ten nanometers and not more than four hundred nanometers. The read sensors 112, 114 and 116 may have multiple widths, w1, w2 and w3, respectively, in the track width, or cross-track, direction. However, in other embodiments, other widths are possible. The widths of the sensors 112, 114 and 116 may also be based on the track pitch. The track pitch is the distance from the center of one track to the center of the next track. Further, the widths may depend not only on the track pitch, but also on the distance between the sensors 112, 114 and 116.

The read sensors 112, 114 and 116 may also be displaced along the cross track direction. Therefore, the centers of each of the read sensors 112, 114 and 116 are not aligned along a vertical line that runs the down track direction. In the embodiment shown, none of the read sensors 112, 114 and 116 are aligned along a vertical line that runs in the down track direction. In other embodiments, some or all of the read sensors 112, 114 and 116 may be aligned. The read sensors 112, 114 and 116 may also partially overlap in the track width/cross track direction. However, in other embodiments, the read sensors 112, 114 and 116 may be aligned.

Also shown are bias structures 122, 123 and 124 that magnetically bias the read sensors 112, 114 and 116, respectively. The magnetic bias structure(s) 122, 123 and/or 124 may be soft bias structures fabricated with soft magnetic material(s). In other embodiments, the magnetic bias structure(s) 122, 123 and/or 124 may be hard magnetic bias structures. Other mechanisms for biasing the sensors 112, 114 and 116 might also be used.

The read sensors are separated by shields 130 and 140. The read sensors 112, 114 and 116 and shields 130 and 140 are surrounded by read shields 120 and 149. Thus, as used herein, a shield may be considered to be an internal shield, which is interleaved with read sensors 112, 114 and 116 and between the outer, read shields. The outermost shields for the read transducer 110 are termed read shields. In the embodiment shown in FIGS. 2-3B, three read sensors 112, 114 and 116 and two internal shields 130 and 140 are shown. However, in another embodiment, another number of read sensors 112, 114 and 116 and internal shields 130 and 140 may be present. The shields/read shields 120, 130, 140 and 149 generally include soft magnetic material. In some embodiments, one or more of the shields 120, 130, 140 and 149 may include ferromagnetic layers that are antiferromagnetically coupled.

The shields 130 and 140 may be configured to not only magnetically shield the sensors 112, 114 and 116, but also to provide electrical isolation. As a result, each shield 130 and 140 includes magnetic metallic layers separated by one or more insulating layers. Thus, the shield 130 includes conductive magnetic layers 132 and 136 that are separated by insulating layer 134. Similarly, the shield 140 includes conductive magnetic layers 142 and 146 separated by insulating layer 144. Thus, the shields 130 and 140 may magnetically shield and electrically isolate the sensors 112, 114 and 116.

Electronic lapping guides (ELGs) 150, 152 and 154 for the transducer 110 and disk drive 100 are shown in FIG. 3B. The ELGs 150, 152 and 154 are used to control lapping of the transducer 110 and thus the stripe heights of the sensors 112, 114 and 116 (length in the stripe height direction). Signal(s) from the ELGs 150, 152 and 154 are used to determine when to terminate lapping of the sensors 112, 114 and 116.

The ELGs 150, 152 and 154 may be formed in the same layers as the sensors 112, 114 and 116, respectively. For example, the ELGs 150, 152 and 154 may be at substantially the same layer as the free layers 113, 115 and 117, respectively, and thus at substantially the same distance from the underlying substrate (not shown). In other words, the ELGs 150 152 and 154 may be coplanar with the sensors 112, 114 and 116, respectively. In some such embodiments, the ELGs 150, 152 and 154 may be coplanar with the sensor layers 113, 115 and 117, respectively. The distances between the ELGs 150 and 152 and the ELGs 152 and 154 may be substantially the same as the distances between the sensors/free layers 112/113 and 114/115 and the sensors/free layers 114/115 and 116/117, respectively. In the embodiment shown in FIGS. 2-3B, therefore, each ELG 150, 152 and 154 corresponds to a sensor 112, 114 and 116, respectively. In other embodiments, the number of sensors and the number of ELGs may not be the same. For example, a single ELG, such as the ELG 152, may be used for controlling lapping of all sensors 112, 114 and 116. In other embodiments, two ELGs may be used for three sensors. Other configurations may also be possible.

The ELGs 150, 152 and 154 may be configured in various manners. In some embodiments, each ELG 150, 152 and 154 may have its own contacts, allowing independent determinations of the resistances of the ELGs 150, 152 and 154. In other embodiments, at least some of the ELGs 150, 152 and 154 may share contacts. For example, the ELGs 150, 152 and 154 may be coupled in series. In such an embodiment, various sub-configurations are possible. For example, only two leads, a first for one side of the ELG 150 and a second for the opposite side of the ELG 154 may be provided. In other embodiments, additional other contacts and leads may be used for separate determinations of the resistance(s) of one or more of the ELGs 150, 152 and 154. In another embodiment, the ELGs 150, 152 and 154 may be connected in parallel. In such an embodiment one lead may connect to one side of the ELGs 150, 152 and 154, while the other lead connects to the other side of the ELGs 150, 152 and 154. Additional contacts and/or leads may be provided for the ELGs 150, 152 and/or 154 in order to isolate the ELG 150, 152 or 154 to independently determine its properties.

Using the ELG(s) 150, 152 and/or 154, lapping of the sensor stacks/sensors 112, 114 and 116 may be controlled. A signal from the ELG(s) 150, 152 and/or 154 may be used to determine when to terminate lapping of the transducer 110. This signal may correspond to the resistance(s) of the ELG(s) 150, 152 and/or 154. The resistances of the ELGs 150, 152 and 154 during lapping correspond to the stripe heights of the ELGs 150, 152 and/or 154 during lapping. As the resistances change, the stripe heights change. The ELG stripe heights correspond to stripe heights of the sensors 112, 114 and 116. Thus, the desired sensor stripe heights may be determined, the corresponding ELG stripe heights determined, and the target resistances of the ELGs 150, 152 and 154 set based on these stripe heights. When the measured resistance(s) of the ELG(s) 150, 152 and/or 154 are the same as the target resistance(s), lapping may be terminated.

Because one or more ELGs 150, 152 and/or 154 are used, fabrication of the transducer 110 may be improved. Use of a single ELG 150, 152 or 154 allows some control over lapping and, therefore, the stripe height of the sensors 112, 114 and 116. If multiple ELGs 150, 152 and/or 154 are used, this control may be improved. For example, lapping may be terminated when a combination of the stripe heights of the sensors 112, 114 and 116 is, as determined by the ELG signals, optimized. For example, if a single ELG 152 were used, lapping may be optimized for only the sensor 114. When some combination of the ELGs 150, 152 and 154 are used, a combination of the stripe heights of the sensors 112, 114 and 116 may be optimized.

Figure 4A:
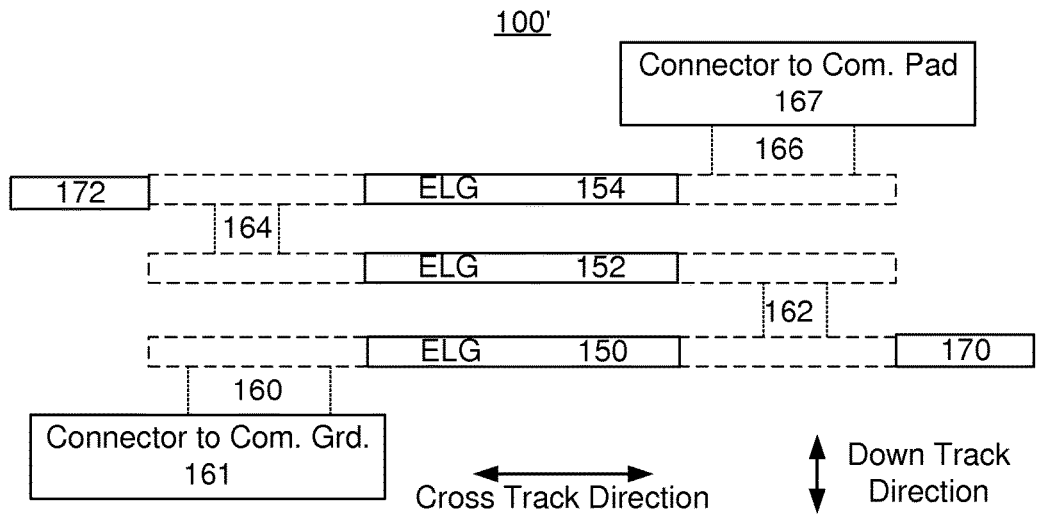
FIGS. 4A-4D depict views of an exemplary embodiment of electrical connections made to the ELGs for a magnetic recording read transducer.
Figures 4B, 4C, 4D:
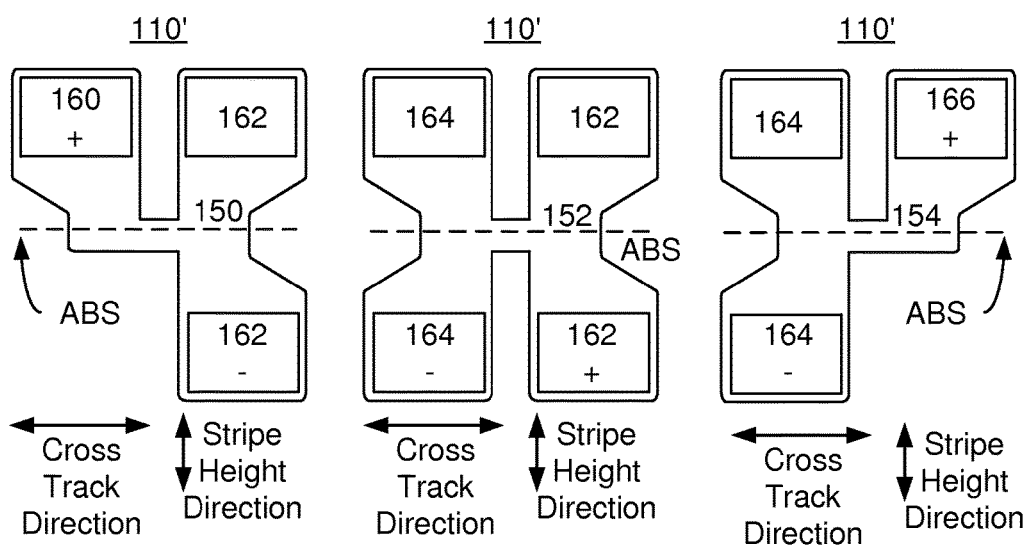

For example, FIGS. 4A-4D depict views of an exemplary embodiment of ELGs 150, 152 and 154 and their electrical connections for a magnetic recording read transducer 110' and disk drive 100'. The read transducer 110' and disk drive 100' are analogous to the read transducer 110 and disk drive 100, respectively. Consequently, similar components have analogous labels. Thus, the ELGs 150, 152 and 154 depicted in FIG. 4A are analogous to the ELGs 150, 152 and 154 depicted in FIG. 3B and used in connection with the sensors/sensor stacks 112, 114 and 116. Referring to FIGS. 3A and 4A-4D, FIG. 4A depicts an ABS-facing view, while FIGS. 4B, 4C and 4D depict plan views of the ELGs 150, 152 and 154, respectively. In the embodiment depicted in FIGS. 4A-4D, the ELGs 150, 152 and 154 are connected in series. Three ELGs 150, 152 and 154 corresponding to the sensors/sensor stacks 112, 114 and 116, respectively are shown. In other embodiments, another number of ELGs may be used.

In addition to the ELGs 150, 152 and 154, common ground connector 161, common pad connector 167, vias 160, 162, 164 and 166 and optional connectors 170 and 172 are shown. The ELG 152 is shown as having a mirror image configuration of pads, while the ELGs 150 and 154 have a partial mirror image. In other embodiments, other pad configurations may be used. The ELG 150 is thus connected to common ground connector 161 through via 160 and to ELG 152 through via 162. The ELG 152 is connected to the ELG 154 and optional connector 172 through via 164. The ELG 154 is connected to the common pad 167 through via 166. The specific manner in which the optional connectors 170 and 172 are connected to the appropriate portions of the ELGs 150, 152 and 154.

Common pads 161 and 167 allow for a single resistance measurement of the series resistance of the ELGs 150, 152 and 154 to be made using two pads. Optional connectors 170 and 172 allow for the resistance of each of the ELGs 150, 152 and 154 to be independently measured. For example, the ELG 150 may have its resistance measured using connectors 161 and 167. The ELG 152 may have its resistance independently measured using connectors 170 and 172. The ELG 154 may have its resistance independently measured using connectors 172 and 167. In other embodiments, one or both of the connectors 170 and 172 may be omitted.

In some embodiments, a measure of the stripe height, target lapping resistance and, therefore, target signal from the ELGs 150, 152 and 154 may be determined as follows. The resistance of ELG 150, $R_{150}$, may be given by $R_{150} = [(W_{150}/SH_{150}) K_{150}]Rs_{150}$, where $W_{150}$ is the track width (width in the cross track direction) of ELG 150; $SH_{150}$ is the stripe height of ELG 150 (length in the stripe height direction perpendicular to the ABS and perpendicular to the page in FIG. 4A), $K_{150}$ is the leads resistance constant for ELG 150 and $R_{s150}$ is the sheet resistance of the ELG 150. Similarly, the resistance of ELG 152, $R_{152}$, may be given by $R_{152} = [(W_{152}/SH_{152}) K_{152}]R_{s152}$, where $W_{152}$ is the track width of ELG 152; $SH_{152}$ is the stripe height of ELG 152, $K_{152}$ is the leads resistance constant for ELG 152 and $R_{s152}$ is the sheet resistance of the ELG 152. The resistance of ELG 154, $R_{154}$, may be given by $R_{154} = [(W_{154}/SH_{154}) + K_{154}]R_{s154}$, where $W_{154}$ is the track width of ELG 154; $SH_{154}$ is the stripe height of ELG 154, $K_{154}$ is the leads resistance constant for ELG 154 and $Rs_{154}$ is the sheet resistance of the ELG 154. The total, series resistance of the ELGs 150, 152 and 154 is $R_{150}+R_{152}+R_{154}$. Thus, the total series resistance of the ELGs 150, 152 and 154 in FIGS. 4A-4D is: $R_{total} = [(W_{150}/SH_{150})+K_{150}]R_{s150}+[(W_{152}/SH_{152})+K_{152}]R_{s152} [(W_{154}/SH_{154}) K_{154}]R_{s154}$. Desired stripe heights for the ELGs 150, 152 and 154 may be selected based on a balance of considerations for the corresponding stripe heights of the read sensors 112, 114 and 116, respectively. Based on the desired stripe heights $SH_{150}$, $SH_{152}$ and $SH_{154}$ for the ELGs 150, 152 and 154, respectively, the target resistance of the combination shown in FIGS. 4A-4D may be determined using the equations above. In some embodiments, the parameters such as $W_x$, $SH_x$, K, and $R_{sx}$, are measured. In other embodiments, the parameters may be set as discussed below. When the actual series resistance of the ELGs 150, 152 and 154 as connected reaches the target resistance, lapping may be terminated.

Figure 5:
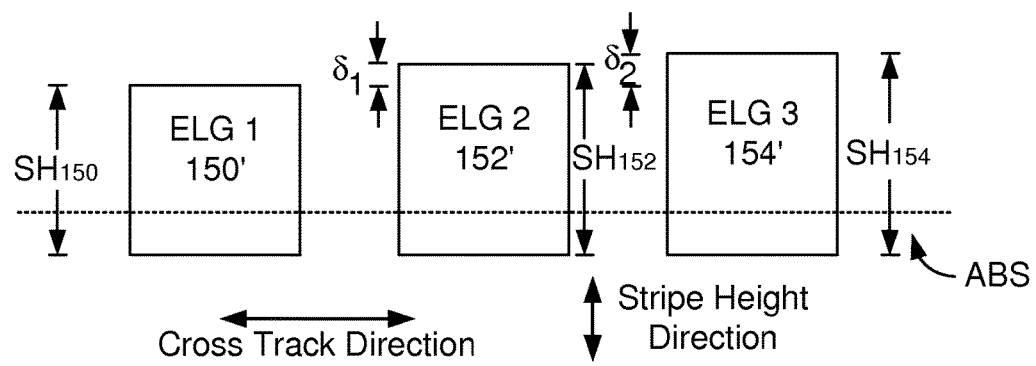
FIG. 5 depicts a plan view of another exemplary embodiment of ELGs for a magnetic recording read transducer.
Figure 6:
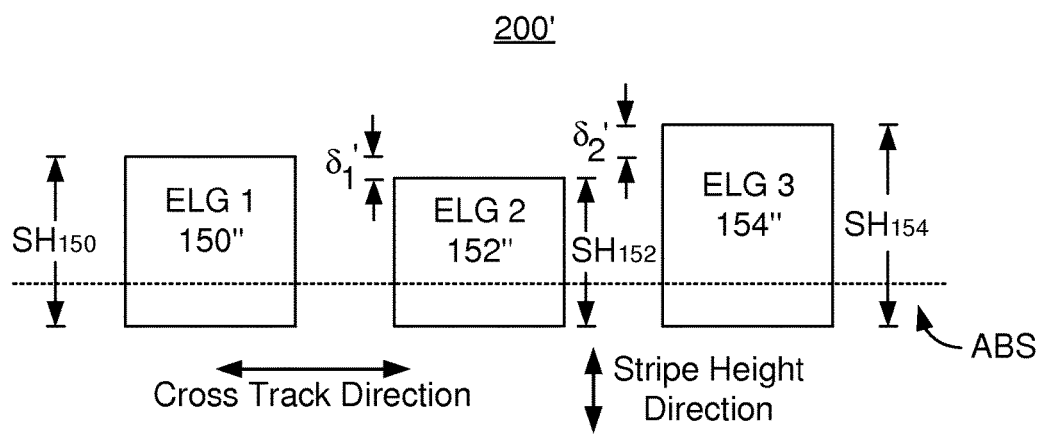
FIG. 6 depicts a plan view of another exemplary embodiment of ELGs for a magnetic recording read transducer.

The desired/target signal may be further calculated as follows. The windage is the offsets in the heights from the design target for the ELGs. The windage thus corresponds to the difference in stripe heights. If the ELG 150 is considered to have a base stripe height, then the stripe heights of ELGs 152 and 154 may be expressed as the stripe height of the ELG 150 and the windages for the ELGs 152 and 154. For example, FIGS. 5 and 6 depict exemplary embodiments of possible windages. In FIG. 5, the ELG 152' and the ELG 154' are both longer than the ELG 150'. Thus, the ELGs 152' and 154' have windages $\delta_1$ and $\delta_2$, respectively, that are both positive. In FIG. 6, the ELG 152" is shorter than the ELG 150" while the ELG 154" is longer. The ELGs 152" and 154" have windage $\delta_1$' that is negative and positive windage $\delta_2$', respectively. In other embodiments, other windages are possible. For example, mechanisms which may be used to account for windage are described in U.S. Pat. No. 8,151,441.

Referring back to FIGS. 4A-4D, the ELGs 152 and 154 are presumed to have windages $\delta_{152}$ and $\delta_{154}$, respectively. Thus, the resistances become: $R_{150}=[(W_{150}/SH_{150})+K_{150}]R_{s150}$; $R_{152}=[(W_{152}/SH_{150}+\delta_{152}))+K_{152}]R_{s152}$ and $R_{154}=[(W_{154}/SH_{150}+\delta_{154}))+K_{154}]R_{s154}$. Further, the ELGs 150, 152 and 154 may be designed such that the leads resistance constants are substantially the same ($K_{150}=K_{152}=K_{154}=K$). The track widths of the ELGs 150, 152 and 154 may also be set to be substantially the same in some embodiments, ($W_{150}=W_{152}=W_{154}=W$). Although it may be unlikely that the sheet resistances of the ELGs 150, 152 and 154 are the same because they are deposited separately, this might be assumed ($R_{s150}=R_{s152}=R_{s154}=R_s$) for simplification. As a result, the total series resistance may be as approximated by $R_{total} = R_s WK\{(1/(KSH_{150})) + 1/W + 1/(K(SH_{150}+\delta_{152})) + 1/W + 1/(K(SH_{150}+\delta_{154})) + 1/W\}$.

The sensitivity may be considered the change in resistance divided by the changes in stripe height ($\Delta R_{total}/\Delta SH$). Given the above, the sensitivity for the configuration shown in FIGS. 4A-4D may be given by: $R_s WK\{[1/(KSH_{150})]^2 + [1/(K(SH_{150}+\delta_{152}))]^2 + [1/(K(SH_{150}+\delta_{154}))]^2\}$. In this embodiment, the sensitivity is known and $R_s$, W and K are known or design constants. Thus, the desired stripe heights may be obtained. If a higher level of precision is desired, then the actual sheet resistances ($R_{s150}$, $R_{s152}$ and $R_{s154}$) and windages ($\delta_{152}$ and $\delta_{154}$) for the ELGs 150, 152 and 154 may be measured and used in determining the lapping rate and target resistance. For wafer level measurements prior to lapping, it may be assumed that $\delta_{152}$ and $\delta_{154}$ are much less than $SH_{150}$. In such an embodiment, $SH_{150} = [R_s W/(\Delta R_{total}/\Delta SH)]^{1/2}$ and $SH_{160} = 3/[R_{total}/(R_s W) - 3W]$. These expressions for the stripe height of ELG 150 (or the other ELGs 152 and/or 154) may be used to estimate the upper bounds of the sensor stack stripe height and/or calibrate lapping.

In some embodiments, the ELGs 150, 152 and 154 may have different track widths. In such embodiments, the differences in track widths is to be accounted for. For example, in some such embodiments, the track widths of one of the ELGs may be a multiple of the track width of the remaining ELGs (e.g. $W_{150} = W_{152} = W_{154}/2$). In all embodiments, however, the relevant parameters may either be measured or designed such that the lapping can be controlled using the ELGs 150, 152 and 154 connected in series to give the desired stripe heights for the sensors 112, 114 and 116, within acceptable limits.

Using the ELGs 150, 152 and/or 154 and the signals discussed above, termination of lapping of the sensors 112, 114 and 116 may be controlled such that a balance between the sensor 112, 114 and 116 responses may be achieved. Stated differently, variations in the stripe heights of the sensors 112, 114 and 116 may be better compensated. Optimizing lapping of the sensors 112, 114 and 116 may improve yield and improve performance of the combination of sensors 112, 114 and 116. If the series resistance, for example between connectors 161 and 167, is used, this control may be achieved using only two contact pads. Thus, the configuration of pads used for a single read sensor need not be changed. In other embodiments, accuracy might be further improved by providing pads for each of the ELGs 150, 152 and 154. Resistances, including sheet resistance, may also be measured for each of the ELGs 150, 152 and 154. Windage may be determined based on the sheet resistances. Further, direct feedback for each of the sensors 112, 114 and 116 may be provided during processing using the corresponding ELG 150, 152 and 154, respectively. Finally, subset(s) of the ELGs 150, 152 and 154 may also be used in fabrication of the disk drive. Thus, fabrication of the disk drive 100, 100' and/or 100" may be improved.

FIG. 7 depicts an ABS-facing view of another exemplary embodiment of ELGs for a magnetic recording read transducer 110" and disk drive 100". The read transducer 110" and disk drive 100" are analogous to the read transducer 110 and disk drive 100. Thus, analogous components have similar labels. Thus, the ELGs 150, 152 and 154 depicted in FIG. 7 are analogous to the ELGs 150, 152 and 154 depicted in FIG. 3B and used in connection with the sensors/sensor stacks 112, 114 and 116. Referring to FIGS. 3A and 7, an ABS-facing view is shown in FIG. 7. In the embodiment depicted in FIG. 7, the ELGs 150, 152 and 154 are connected in parallel. Three ELGs 150, 152 and 154 corresponding to the sensors/sensor stacks 112, 114 and 116, respectively are shown. In other embodiments, another number of ELGs may be used.

In addition to the ELGs 150, 152 and 154, common ground connector 161, common pad connector 167, vias 160, 162, 163, 164, 165 and 166 are shown. The vias 160, 162, 164, 166 and connectors 161 and 167 are analogous to those shown in FIG. 4A. The ELGs 150, 152 and 154 may each have a mirror image configuration of pads. In other embodiments, other pad configurations may be used. The ELG 150 is thus connected to common ground connector 161 through via 160 and to ELG 152 through vias 162 and 163. The ELG 152 is connected to the ELG 154 and optional connector 172 through vias 164 and 165. The ELG 154 is connected to the common pad 167 through via 166. Although not shown, optional connectors for independently determining the resistances of the ELGs 150, 152 and/or 154 may be provided. Such connectors are analogous to the connectors 170 and 172 depicted in FIG. 4A. Common pads 161 and 167 allow for a single resistance measurement of the parallel resistance of the ELGs 150, 152 and 154 to be made using two pads.

In some embodiments, a measure of the stripe height, target lapping resistance and, therefore, target signal from the ELGs 150, 152 and 154 may be determined as follows. The resistances of ELGs 150, 152 and 154 ($R_{150}$, $R_{152}$ and $R_{154}$) are described above. The total, parallel resistance of the ELGs 150, 152 and 154 is $1/(1/R_{150} + 1/R_{152} + 1/R_{154})$. Thus, the total parallel resistance of the ELGs 150, 152 and 154 in FIG. 7 is: $R_{total,\parallel} = 1/\{[[(W_{150}/SH_{150}) + K_{150}]R_{s150}]^{-1} + [[(W_{152}/SH_{152}) + K_{152}]R_{s152}]^{-1} + [[(W_{154}/SH_{154}) \quad K_{154}] R_{s154}]^{-1}\}$ Desired stripe heights for the ELGs 150, 152 and 154 may be selected based on a balance of considerations for the corresponding stripe heights of the read sensors 112, 114 and 116, respectively. Based on the desired stripe heights $SH_{150}$, $SH_{152}$ and $SH_{154}$ for the ELGs 150, 152 and 154, respectively, the target resistance of the combination shown in FIG. 7 may be determined using the equations above. In some embodiments, the parameters such as $W_x$, $SH_x$, $K_x$, and $R_{sx}$, are measured. In other embodiments, the parameters may be set as discussed below. When the actual resistance of the ELGs 150, 152 and 154 as connected in parallel reaches the target resistance, lapping may be terminated.

The desired/target signal may be further calculated using the windage described above. The ELGs 152 and 154 are presumed to have windages $\delta_{152}$ and $\delta_{154}$, respectively, with respect to the ELG 150. Thus, the total, parallel resistance becomes $R_{total,\parallel} = 1/\{[[(W_{150}/SH_{150}) + K_{150}]R_{s150}]^{-1} + [[(W_{152}/(SH_{150}+\delta_{152})) + K_{152}]R_{s152}]^{-1} \quad [[(W_{154}/(SH_{150}+\delta_{154})) + K_{154}]R_{s154}]^{-1}\}$. As discussed above with respect to the series embodiment, the ELGs 150, 152 and 154 may be designed such that the leads resistance constants are substantially the same and given by K. The track widths of the ELGs 150, 152 and 154 may also be set to be substantially the same in some embodiments, W. Although it is unlikely that the sheet resistances of the ELGs 150, 152 and 154 are the same, this might be assumed ($R_{s150} = R_{s152} = R_{s154} = R_s$) for simplification. As a result, the total parallel resistance may be approximately by $R_{total,\parallel} = 1/\{[[(W/SH_{150}) + K]R_s]^{-1} + [[(W/(SH_{150}+\delta_{152})) + K]R_s]^{-1} + [[(W/(SH_{150}+\delta_{154})) + K] R_s]^{-1}\}$. The sensitivity, estimated upper bound for the stripe heights and other parameters may be calculated or measured in a manner analogous to that described above in the series case. Similarly, differences in track width may be accounted for. In all embodiments, however, the relevant parameters may either be measured or designed such that the lapping can be controlled using the ELGs 150, 152 and 154 connected in parallel to give the desired stripe heights for the sensors 112, 114 and 116, within acceptable limits.

Using the ELGs 150, 152 and/or 154 and the signals discussed above, termination of lapping of the sensors 112, 114 and 116 may be controlled such that a balance between the sensor 112, 114 and 116 responses may be achieved. Stated differently, variations in the stripe heights of the sensors 112, 114 and 116 may be better compensated. Optimizing lapping of the sensors 112, 114 and 116 may improve yield and improve performance of the combination of sensors 112, 114 and 116. If the parallel resistance, for example between connectors 161 and 167, is used, this control may be achieved using only two contact pads. Thus, the configuration of pads used for a single read sensor need not be changed. In other embodiments, accuracy might be further improved by providing pads for each of the ELGs 150, 152 and 154. Resistances, including sheet resistance, may also be measured for each of the ELGs 150, 152 and 154. Windage may be determined based on the sheet resistances. Further, direct feedback for each of the sensors 112, 114 and 116 may be provided during processing using the corresponding ELG 150, 152 and 154, respectively. Subset(s) of the ELGs 150, 152 and 154 may also be used in fabrication of the disk drive. Thus, fabrication of the transducer 110 and/or 110''' may be improved FIGS. 8A and 8B depict an ABS-facing view and a plan view, respectively, of another exemplary embodiment of an ELG for a magnetic recording read transducer 110' and disk drive 100'''. The read transducer 110''' and disk drive 100''' are analogous to the read transducer 110 and disk drive 100. Thus, analogous components have similar labels. Thus, the ELG 152 depicted in FIGS. 8A and 8B is analogous to the ELG 152 depicted in FIG. 3B and used in connection with the sensors/sensor stacks 112, 114 and 116. Although the ELG 152, which corresponds to the center sensor/sensor stack 114 may be preferred if a single ELG is used, in other embodiments, the ELG 150 or 154 might be employed instead.

In addition to the ELG 152, ground connector 161, pad connector 167 and vias 160 and 166 are shown. The vias 160 and 166 and connectors 161 and 167 are analogous to those shown in FIG. 4A. Additional vias 162 and 164 may be coupled to optional connectors (not shown). The ELG 152 may each have a mirror image configuration of pads. In other embodiments, other pad configurations may be used. The ELG 150 is thus connected to common ground connector 161 through via 160 and to ELG 152 through vias 162 and 163. The ELG 152 is connected to the ELG 154 and optional connector 172 through vias 164 and 165. The ELG 154 is connected to the common pad 167 through via 166. Pads 161 and 167 allow for a single resistance measurement of the ELG 152 to be made using two pads.

In some embodiments, a measure of the stripe height, target lapping resistance and, therefore, target signal from the ELG 152 may be determined as follows. The resistance of ELG 152 is $R_{152}=[(W_{152}/(SH_{150}+\delta_{152}))+K_{152}]R_{s152}$. The desired (or target) stripe height for the ELG 152 may be selected based on a balance of considerations for the corresponding stripe heights of the read sensors 112, 114 and 116, respectively. For example, the desired stripe height of the ELG 152 may be based on the desired stripe height of the sensor 114. The corresponding target resistance may be calculated using the equation above. In some embodiments, the parameters such as $W_{152}$, $SH_{152}$, $K_{152}$ and $R_{s152}$ are measured. In other embodiments, the parameters may be set below. When the actual resistance of the ELG 152 reaches the target resistance, lapping may be terminated.

Using the ELG 152 and the signals discussed above, termination of lapping of the sensors 112, 114 and 116 may be controlled. Because a single sensor is used, fabrication may be simplified and only two contact pads used. Electrical insulation of the ELG 152 may also be improved because no conductive ELGs, such as an ELG 150 or 154, are close to the ELG 152.

Figure 9:
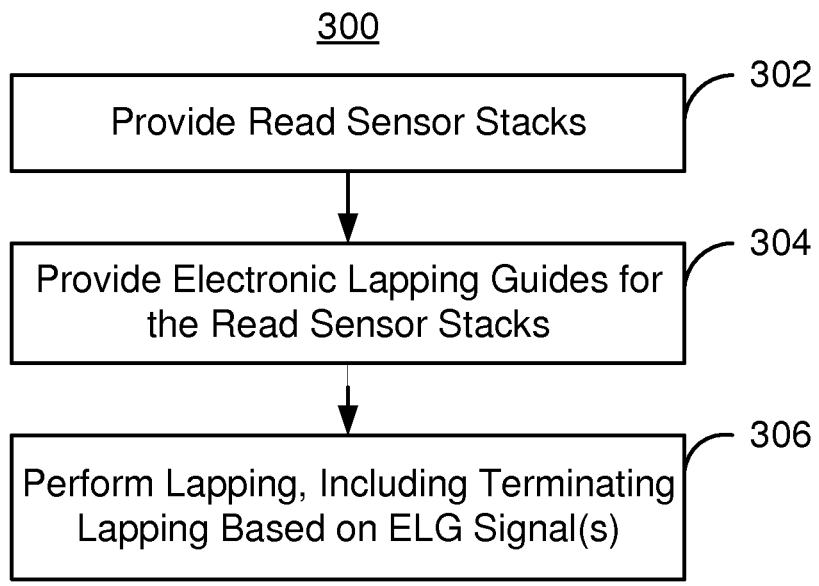
FIG. 9 is a flow chart depicting an exemplary embodiment of a method for fabricating a magnetic recording read transducer.

FIG. 9 is an exemplary embodiment of a method 300 for providing a read transducer having multiple read sensors and using ELG(s) to control lapping. For simplicity, some steps may be omitted, interleaved, and/or combined. The method 300 is also described in the context of providing a single recording transducer 110/110'/110" depicted in FIGS. 2, 3A-3B, 4A-4D and 7. However, the method 300 may be used to fabricate multiple devices on a wafer at substantially the same time. The method 300 may also be used to fabricate other transducers including but not limited to any combination of the transducers 110, 110', 110" and/or 110'''. The method 300 is also described in the context of particular layers. A particular layer may include multiple materials and/or multiple sub-layers. The method 300 also may start after formation of other portions of the magnetic recording transducer.

The read sensor stacks are provided, via step 302. Step 302 typically includes depositing the layers for each of the sensors, then defining the sensors in at least the track width direction. The stripe height away from the ABS may also be defined in step 302. Portions of step 302 are generally interleaved with other steps. For example, the read sensor stack 112 may be formed, then a number of steps occur before formation of the read sensor stack 114. Similarly, a number of steps occur between formation of the read sensor stack 114 and fabrication of the read sensor stack 116.

The ELG(s) 150, 152 and/or 154 are provided, via step 304. In some embodiments, step 304 includes depositing and patterning the conductive material(s) for the ELG(s) 150, 152 and/or 154. Portions of step 304 may be interleaved with portions of step 302 such that the ELG(s) 150, 152 and 154 are at level(s) corresponding to the sensor stacks 112, 114 and 116, respectively. For example, the ELG 150 may be deposited and patterned at around the time that one or more of the layers of the sensor stack 112 is provided. Similarly, the ELG 152 may be deposited and patterned at around the time that one or more of the layers of the sensor stack 114 is provided. The ELG 154 may be deposited and patterned at around the time that one or more of the layers of the sensor stack 116 is provided. Thus, the ELG(s) 150, 152 and 154 are at substantially the same layer(s) in the device as the sensor stacks 112, 114 and 116. Fabrication of the transducer 110, 110' and/or 110" continues until the slider is ready for lapping.

Lapping is then performed until termination that is based upon the ELG signal(s), via step 306. Step 306 may include determining a target resistance for one or more of the ELG(s) 150, 152 and 154 and/or a resistance of a combination of one or more of the ELG(s) 150, 152 and 154. For example, a target for the series or parallel resistance described above may be determined. As is discussed above, this target resistance translates to stripe height(s) of the ELG(s) 150, 152 and/or 154 and to stripe heights of the sensors 112, 114 and 116. When the signal from the ELG(s) 150, 152 and/or 154 reaches the target, lapping may be terminated.

Using the method 300, the transducer 110, 110' and/or 110" and disk drive 100, 100' and/or 100", respectively, may be accomplished. Because lapping is controlled using the signals from the ELG(s) 150, 152 and/or 154, a better balancing of the stripe heights of the sensors 112, 114 and 116 may be achieved. Thus, yield for the method 300 may be improved and device performance enhanced.

Figure 10:
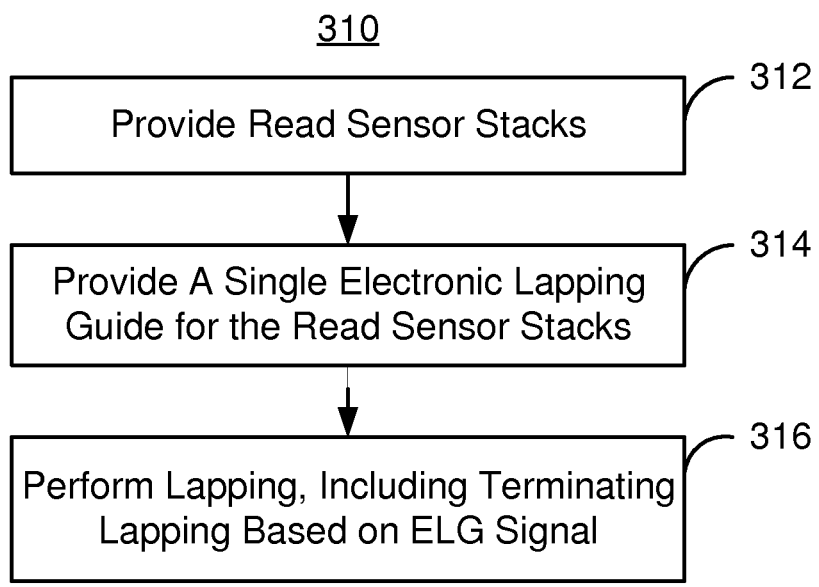
FIG. 10 is a flow chart depicting an exemplary embodiment of a method for fabricating a magnetic recording read transducer.

FIG. 10 is an exemplary embodiment of a method 310 for providing a read transducer having multiple read sensors and using an ELG to control lapping. For simplicity, some steps may be omitted, interleaved, and/or combined. The method 310 is also described in the context of providing a single recording transducer 110′″ depicted in FIGS. 2, 3A-3B, and 8A-8B. However, the method 310 may be used to fabricate multiple transducers at substantially the same time. The method 310 may also be used to fabricate other transducers. The method 310 is also described in the context of particular layers. A particular layer may include multiple materials and/or multiple sub-layers. The method 310 also may start after formation of other portions of the magnetic recording transducer.

The read sensor stacks are provided, via step 312. Step 312 typically includes depositing the layers for each of the sensors, then defining the sensors in at least the track width direction. The stripe height away from the ABS may also be defined in step 312. Portions of step 312 are generally interleaved with other steps. For example, the read sensor stack 112 may be formed, then a number of steps occur before formation of the read sensor stack 114. Similarly, a number of steps occur between formation of the read sensor stack 114 and fabrication of the read sensor stack 116. Step 312 is analogous to step 302 of the method 300.

The ELG 152 is provided, via step 314. In some embodiments, step 314 includes depositing and patterning the conductive material(s) for the ELG 152. Portions of step 314 may be interleaved with portions of step 312 such that the ELG 152 is at a location corresponding to the sensor stack 114. For example, the ELG 152 may be deposited and patterned at around the time that one or more of the layers of the sensor stack 114 is provided. In other embodiments, the method 310 may form the ELG 150 or 154 depicted in FIG. 3B instead of the EGL 152. Thus, the ELG 150 is at substantially the same layer(s) in the device as the sensor stacks 114 116. Fabrication of the transducer 110′″ continues until the slider is ready for lapping.

Lapping is then performed until termination that is based upon the ELG signal, via step 316. Step 316 may include determining a target resistance for one or more of the ELG 152. As is discussed above, this target resistance translates to stripe height of the ELG 152 and to stripe heights of the sensors 112, 114 and 116. When the signal from the ELG(s) 150, 152 and/or 154 reaches the target, lapping may be terminated.

Using the method 310, the transducer 110′″ and disk drive 100′″, respectively, may be accomplished. Because of the signals from the ELG(s) 150, 152 and/or 154, lapping may be controlled. Thus, yield for the method 310 may be improved and device performance enhanced. Thus, the benefits of the magnetic transducer(s) 110, 110′, 110″ and/or 110′″ may be achieved.

What is claimed is:

1. A magnetic read transducer comprising:
a first read sensor;
a second read sensor;
a third read sensor;
a first electronic lapping guide associated with the first read sensor to control a stripe height of the first read sensor;
a second electronic lapping guide associated with the second read sensor to control the stripe height of the second read sensor; and
a third electronic lapping guide associated with the third read sensor to control the stripe height of the third read sensor,
wherein the first electronic lapping guide is connected to a common ground connector, and wherein the third electronic lapping guide is connected to a common pad.

2. The magnetic read transducer of claim 1, wherein the first read sensor and the second read sensor are separated by a first distance, wherein the first electronic lapping guide and the second electronic lapping guide are separated by a second distance, and wherein the first distance is substantially same as the second distance.

3. The magnetic read transducer of claim 1, wherein the first electronic lapping guide is connected to the second electronic lapping guide through a first via and the second electronic lapping guide is connected to the third electronic lapping guide through a second via.

4. The magnetic read transducer of claim 1, wherein the first read sensor is separated from the second read sensor by a first internal magnetic shield and the second read sensor is separated from the third read sensor by a second internal magnetic shield.

5. The magnetic read transducer of claim 1, wherein the first read sensor and the second read sensor are separated by a first distance in a down track direction and the second read sensor and the third read sensor are separated by a second distance in the down track direction, wherein the first read sensor, the second read sensor, and the third read sensor are offset from one another in a cross track direction that is perpendicular to the down track direction, and wherein a width of the first read sensor overlaps with a width of the second read sensor in the cross track direction, and wherein the width of the second read sensor overlaps with a width of the third read sensor in the cross track direction.

6. The magnetic read transducer of claim 1, further comprising a first read shield and a second read shield, wherein the first read sensor, the second read sensor, and the third read sensor are between the first read shield and the second read shield in a down track direction.

* * * * *